(12) United States Patent
Vigue et al.

(10) Patent No.: US 7,620,816 B1
(45) Date of Patent: *Nov. 17, 2009

(54) SYSTEM AND METHOD FOR AUTOMATIC SELECTION OF SERVICE PROVIDER FOR EFFICIENT USE OF BANDWIDTH AND RESOURCES IN A PEER-TO-PEER NETWORK ENVIRONMENT

(75) Inventors: Charles L. Vigue, Lapine, OR (US); Martin Fallenstedt, Beaverton, OR (US); Daniel Melchione, Beaverton, OR (US); Victor Kouznetsov, Aloha, OR (US)

(73) Assignee: McAfee, Inc., Santa Clara, CA (US)

( * ) Notice: Subject to any disclaimer, the term of this patent is extended or adjusted under 35 U.S.C. 154(b) by 871 days.

This patent is subject to a terminal disclaimer.

(21) Appl. No.: 11/116,797

(22) Filed: Apr. 27, 2005

Related U.S. Application Data

(62) Division of application No. 09/921,941, filed on Aug. 2, 2001, now Pat. No. 7,062,555.

(60) Provisional application No. 60/282,333, filed on Apr. 6, 2001, provisional application No. 60/298,681, filed on Jun. 15, 2001.

(51) Int. Cl.
*H04L 9/00* (2006.01)
(52) U.S. Cl. .................................................. 713/176
(58) Field of Classification Search .................. 709/223, 709/225, 229; 713/153, 176, 151, 163, 168
See application file for complete search history.

(56) References Cited

U.S. PATENT DOCUMENTS

| | | | |
|---|---|---|---|
| 5,832,208 A | 11/1998 | Chen et al. | 713/201 |
| 5,864,667 A | 1/1999 | Barkan | 713/201 |
| 5,864,871 A | 1/1999 | Kitain et al. | 707/104.1 |

(Continued)

OTHER PUBLICATIONS

Advisory Action from U.S. Appl. No. 09/922,329 mailed Nov. 7, 2005.

(Continued)

*Primary Examiner*—Beemnet W Dada
(74) *Attorney, Agent, or Firm*—Zilka-Kotab, PC

(57) ABSTRACT

A system and method for distributed function discovery with third party responses in a peer-to-peer network to facilitate efficient use of bandwidth and resources are disclosed. The method for secure automatic selection of a designated service provider in a peer-to-peer network generally comprises broadcasting a digitally signed election initiating packet containing a value for at least one criteria by a sending node, awaiting response time-out period expiry or receipt of a response election packet, broadcasting a digitally signed election result packet indicating the sending node is the designated service provider if response time-out period expiry occurs prior to receipt of a response election packet, and awaiting for, verifying, and storing election result in an election result broadcast if receipt of a response election packet occurs prior to expiry of response time-out period. The election result broadcast may contain a value for the at least one criteria such that verifying the election result includes verifying that the value for at least one criteria in the response election packet wins over the value for at least one criteria in the initiating election packet. The criteria may be, for example, node name, MAC (media access control) address, Internet access, bandwidth, operating system, and processor speed.

15 Claims, 10 Drawing Sheets

U.S. PATENT DOCUMENTS

| | | | | |
|---|---|---|---|---|
| 5,987,140 | A | 11/1999 | Rowney et al. | 705/79 |
| 6,212,633 | B1 | 4/2001 | Levy et al. | 713/153 |
| 6,438,594 | B1 * | 8/2002 | Bowman-Amuah | 709/225 |
| 6,496,851 | B1 | 12/2002 | Morris et al. | 709/204 |
| 6,615,253 | B1 | 9/2003 | Bowman-Amuah | 709/219 |
| 6,697,824 | B1 | 2/2004 | Bowman-Amuah | 709/229 |
| 6,742,023 | B1 | 5/2004 | Fanning et al. | 709/219 |
| 6,782,527 | B1 | 8/2004 | Kouznetsov et al. | 717/103 |
| 6,820,199 | B2 | 11/2004 | Wheeler et al. | 713/170 |
| 6,850,985 | B1 | 2/2005 | Giloi et al. | 709/230 |
| 6,851,053 | B1 | 2/2005 | Liles et al. | 713/168 |
| 6,983,326 | B1 | 1/2006 | Vigue et al. | 709/229 |
| 7,062,555 | B1 | 6/2006 | Kouznetsov et al. | 709/225 |
| 7,159,113 | B1 * | 1/2007 | Taniguchi et al. | 713/170 |
| 7,181,506 | B1 | 2/2007 | Vigue et al. | 709/219 |
| 7,306,148 | B1 * | 12/2007 | Morganstein | 235/386 |
| 2001/0037358 | A1 * | 11/2001 | Clubb et al. | 709/203 |
| 2001/0051996 | A1 | 12/2001 | Cooper et al. | 709/217 |
| 2002/0069218 | A1 | 6/2002 | Sull et al. | 707/501.1 |
| 2002/0103940 | A1 | 8/2002 | Sullivan et al. | 709/250 |
| 2002/0120697 | A1 | 8/2002 | Generous et al. | 709/206 |
| 2004/0199474 | A1 | 10/2004 | Ritter | 705/65 |

OTHER PUBLICATIONS

Office Action Summary from U.S. Appl. No. 09/921,521 mailed on Nov. 17, 2004.

Final Office Action Summary from U.S. Appl. No. 09/921,521 mailed on May 3, 2005.

Advisory Action from U.S. Appl. No. 09/921,521 mailed on Jul. 26, 2005.

Notice of Allowance from U.S. Appl. No. 09/921,521 mailed on Dec. 1, 2005.

Supplemental Notice of Allowance from U.S. Appl. No. 09/921,521 mailed on Jan. 11, 2007.

Notice of Allowance from U.S. Appl. No. 09/921,941 mailed on Apr. 6, 2005.

Office Action Summary from U.S. Appl. No. 09/921,941 mailed on Nov. 10, 2004.

Final Office Action Summary from U.S. Appl. No. 09/921,940 mailed on Oct. 19, 2004.

Notice of Allowance from U.S. Appl. No. 09/921,940 mailed on May 10, 2005.

Fox G., Peer-to-peer networks, Computing in Science & Engineering vol. 3, issue:3, May-Jun. 2001, pp. 75-77.

Dabek et al., Building peer-to-peer systems with chord, a distributed lookup server, Hot topics in operating systems, 2001, Proceedings of the Eighth Workshop on, May 20-22, 2001, pp. 81-86.

Druschel et al., PAST: a Large-scale persistent peer-to-peer storage utility, hot topics in Operating system, 2001, proceedings of the Eighth Workshop on, May 20-22, 2001, pp. 75-80.

Marvin Sirbu et al., NetBill: An Internet Commerce System optimized for Network Delivered Services, IEEE CompCon Conference, Mar. 1995.

Kovalerchuk et al., Comparison of relational methods and attribute—based methods for data mining in intelligent systems, proceedings of the 1999 IEEE, International Symposium on Intelligent System and Semiotics, Cambridge, MA, pp. 162-166, Sep. 1999.

Zhao, Liu et al., A Scalable Wireless Virtual LAN, Nov. 1996, Proceeding of the $2^{nd}$ Annual international Conference On Mobile Computing and Networking.

Cameron Ross Dunne, Using Mobile Agents for Network Resource Discovery in Peer-to Peer Networks, Jun. 2001 ACM SIGecom Exchanges, vol. 2, issue 3.

Eugster et al., Lightweight Probalilistic Broadcast, Dependable Systems And Networks, 2001, Proceeding, the International Conference on Jul. 1-4, 2001, pp. 443-452.

* cited by examiner

SYSTEM AND METHOD FOR AUTOMATIC SELECTION OF SERVICE PROVIDER FOR EFFICIENT USE OF BANDWIDTH AND RESOURCES IN A PEER-TO-PEER NETWORK ENVIRONMENT

CROSS REFERENCE TO RELATED APPLICATIONS

This is a application of prior application Ser. No. 09/921,941 filed on Aug. 2, 2001 now U.S. Pat. No. 7,062,555, the disclosure of which is incorporated herein by reference.

This application claims the priority benefit of U.S. Provisional Patent Application No. 60/282,333, entitled "System and Method for Efficient Use of Bandwidth and Resources in a Peer-to-Peer Network Environment" and filed Apr. 6, 2001 and U.S. Provisional Patent Application No. 60/298,681, entitled "System and Method for Efficient Updating of Virus Protection Software and Other Efficient Uses of Bandwidth and Resources in a Peer-to-Peer Network Environment" and filed Jun. 15, 2001, both of which are incorporated herein by reference in their entireties.

BACKGROUND OF THE INVENTION

1. Field of the Invention

The present invention relates generally to a system and method for efficient use of bandwidth and resources in a peer-to-peer network environment. More specifically, a system and method for distributed function discovery with third party responses in a peer-to-peer network to facilitate efficient use of bandwidth and resources are disclosed.

2. Description of Related Art

Conventionally, to obtain anti-virus product updates and/or signature files, computers rely on a pull approach in which each client or server computer must retrieve the updated anti-virus file directly from a source via the Internet. For a computer network, a network administrator may allow anti-virus signature files to become out of date because there are simply too many clients on the network for effective management. Alternatively, the network administrator may schedule the clients to automatically pull the updated anti-virus file from the Internet when each client logs onto the computer. However, such an approach can result in a bandwidth crunch such as in the early morning work hours when most users log onto their computers.

Connections to the Internet from within an organization, particularly from a small to medium sized organization, may be relatively slow. For example, a small to medium sized business may share a single cable or DSL modem, a 56K modem, or an ISDN line. In contrast, in a typical work group interconnected via a LAN, connections on the LAN are generally much faster, the typical LAN being 100/TX (100 Mbps). Peer-to-peer networks thus partially address the need for efficient use of bandwidth and resources in a computer network.

However, an actual service provider in a peer-to-peer network of a service may not be easily locatable by other peers in the network. In particular, because there is no single dedicated server in a peer-to-peer network, a node attempting to locate a service provider may not be able to locate the desired service provider or may unnecessarily expend efforts and utilize resources to locate the desired service provider.

Thus, it is desirable to provide a system and method for an efficient and effective way to discover service providers in a peer-to-peer network environment, particularly those service providers that are not easily locatable.

SUMMARY OF THE INVENTION

A system and method for distributed function discovery with third party responses in a peer-to-peer network to facilitate efficient use of bandwidth and resources are disclosed. The peering service system and method facilitate in spreading load amongst peers in a distributed network interconnected via a LAN in a smooth, secure and scalable way. The service provider selection from among the peers is preferably achieved through an automatic selection process using signed certificates to authenticate the legitimacy of each potential service provider. Upon completion of the selection process, the selected service provider optionally transmits a broadcast message over the network to notify all other peers of the outcome of the selection process.

It should be appreciated that the present invention can be implemented in numerous ways, including as a process, an apparatus, a system, a device, a method, or a computer readable medium such as a computer readable storage medium or a computer network wherein program instructions are sent over optical or electronic communication lines. Several inventive embodiments of the present invention are described below.

The method may include verifying that the response election packet wins over the initiating election packet based on the value for the criteria. In addition, the election result broadcast may also contain a value for the criteria such that verifying the election result includes verifying that the value for the criteria in the response election packet wins over the value for the criteria in the initiating election packet. The response time-out period is optionally at least a sum of maximum delay election response period and round trip transmission time.

Preferably, the method includes verifying a digital signature of the response election packet and the election result broadcast. Each of the digitally signed election initiating packet and digitally signed election result packet may be signed by a 1024-bit VeriSign digital certificate.

According to another preferred embodiment, a method for secure automatic selection of a designated service provider in a peer-to-peer network generally comprising receiving a digitally signed election initiating packet containing a value for a criteria by a receiving node from a sending node, determining one of the nodes as current winner by comparing the values of the criteria in the election initiating packet and at the receiving node, awaiting for, verifying, and storing election result in an election result broadcast if the sending node is the current winner, or awaiting expiry of response delay period or receipt of an additional election packet if the receiving node is the current winner, and broadcasting a digitally signed election result packet indicating the receiving node is the designated service provider if expiry of response delay period occurs prior to receipt of any additional election packet. Preferably, the response delay period is randomly generated within a predetermined range.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF SPECIFIC EMBODIMENTS

A system and method for distributed function discovery with third party responses in a peer-to-peer network to facilitate efficient use of bandwidth and resources are disclosed. The peering service facilitates in spreading load amongst peers in a distributed network interconnected via a LAN in a smooth, secure and scalable way. A service or an application that is service-enabled may minimize or reduce the usage of, for example, Internet bandwidth by attempting to locate a local aliased copy of a requested resource residing within the peer-to-peer network. If a local aliased copy of the requested resource is located, the requesting computer may obtain the requested resources locally. Once the requesting computer obtains a copy of the requested resource, whether locally or remotely, the requesting computer may itself become a server for the aliased copy for subsequent requests for the resource.

The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
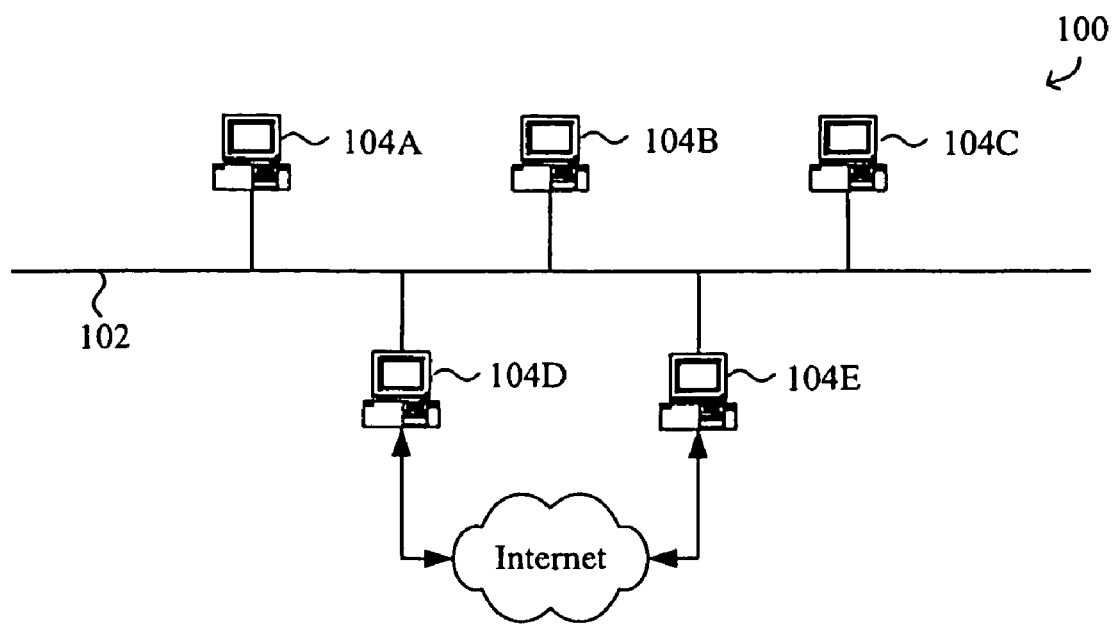
FIG. 1 is a block diagram of an exemplary computer network suitable for implementing a peering service in a peer-to-peer network to facilitate efficient use of bandwidth and resources.

FIG. 1 is a block diagram of an exemplary computer network 100 suitable for implementing the peering service in a peer-to-peer network to facilitate efficient use of bandwidth and resources as described herein. In particular, the computer network 100 comprises nodes, computers, or workstations 104A-E interconnected via a LAN 102. It is to be understood that the LAN 102 may be implemented using any suitable network mechanism including wire and wireless. In the exemplary computer network 100, only two of the nodes 104D and 104E have access to the Internet.

Figure 2:
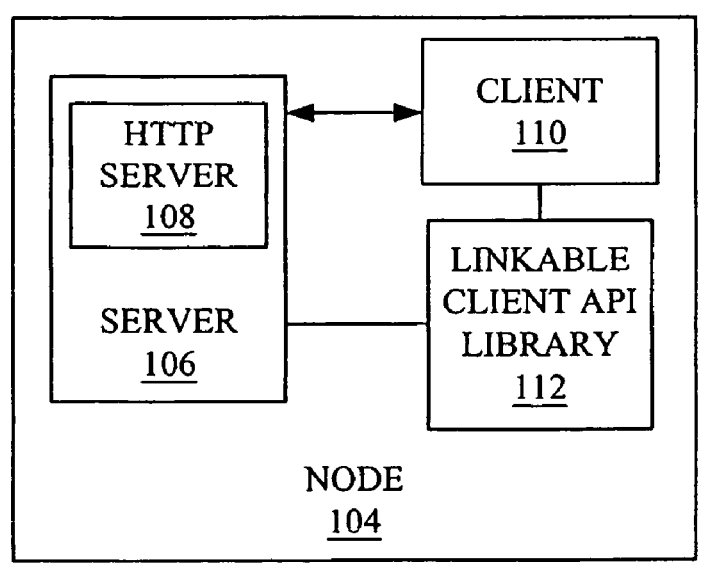
FIG. 2 is a block diagram illustrating an exemplary peering service system and method implemented at a node of the computer network of FIG. 1.

FIG. 2 is a block diagram illustrating an exemplary peering service system and method implemented at a node of the computer network of FIG. 1. As shown, each node 104 provides the functionality of both a server 106 and a client 110. The peering service system utilizes a port, such as port 1967, for transmitting directed or broadcast messages to peers on the network. The server preferably includes an embedded HTTP server 108, typically a micro HTTP server. The HTTP server 108 allows aliased URLs to be accessed by other peers on the network. The HTTP server 108 preferably uses an obscure port such as port 6515 and is preferably restricted to operations required to facilitate distribution of, for example, cached files and uploading of data or requests.

Typically, each node runs both the server and the client. However, each node may run only the client or the server. The peering system and method are preferably implemented as a peering service application ("service" or "service-enabled application") or daemon process. It is noted that a service-enabled application need not be a service application. For example, a service-enabled application may also refer to a service-aware application that fires up, communicates with the service and then shuts down interactively.

The peering system preferably provides a linkable client API library 112 to facilitate communication between the peering service and any service-enabled applications. In one preferred embodiment, the peering system may export the client API library 112 to any service-enabled application such that the service-enabled application may utilize the peering service to discover any type of resource that can be identified with a URL or URI, for example. Alternatively, a given application and the peering service may be tightly coupled so as to eliminate the need for the linkable client API library.

Figure 3:
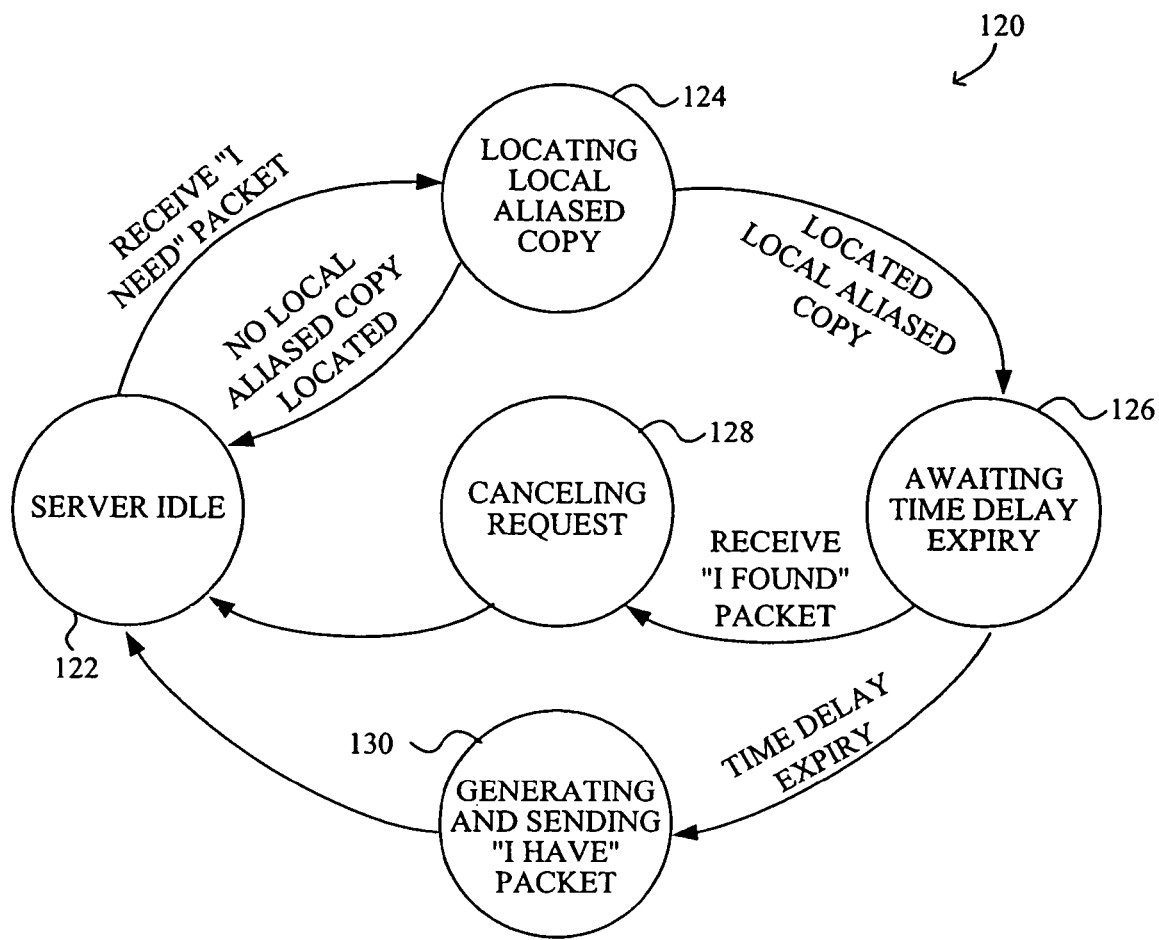
FIG. 3 is a state diagram illustrating states of a typical peering service server in processing a request from a peering client in the peer-to-peer network.

FIG. 3 is a state diagram illustrating states 120 of a typical peering service server in processing a given request from a peering client in the peer-to-peer network. Initially, the service server is in an idle state 122 while listening on a designated port for a broadcast request message from a peer client on the network. When the service server receives a broadcast request message such as an "I need" packet from a peering client on the network, the service server transitions to a locating local aliased copy state 124. In particular, the service server refers to its list of local aliased copies to determine if the service server has a local copy of the requested resource or item identified by, for example, an URL/URI. If the service server determines that it does not have a local copy of the requested resource, then the service server returns to the server idle state 122.

Alternatively, if the service server determines that it has a local copy, the service server preferably waits a randomly generated delay response time period at stage 126. The service server may generate a random number, such as between 0 and 2000, which the service server utilizes as the length of time it waits before responding. In one preferred embodiment, the random number is the number of milliseconds the service server waits before replying to the request. While the service server awaits expiry of the randomly generated delay response time period, the service server listens for a broadcast "I found" packet from the requesting client corresponding to the received request packet. It is noted that regardless of the state of the service server for a given peer request, the service server listens for new requests such as "I need" packets. The broadcast "I found" packet from the requesting client indicates that the requesting client has found the requested resource. If the service server receives an "I found" packet from the requesting client before expiry of the delay response time period, the service server transitions to state 128 to cancel the response to the request and returns to server idle state 122.

Alternatively, if no "I found" packet is received prior to the expiration of the delay response time period, the service server transitions to state 130 to transmit an "I have" packet directly to the requesting peer client. The "I have" packet preferably contains a local alias for the requested object on the service server which the requesting peer can access via the HTTP server of the of the service server. Although not preferred, the service server may alternatively broadcast the "I have" packet over the network rather than transmitting it directly to the requesting client. The service server then returns to the server idle state 122.

As is evident, the randomly generated delay response time period allows multiple peer servers to share loads in an orderly fashion. In particular, randomizing the delay response time period ensures that any given node would not automatically become the default server to a large portion of the peers and eliminates any need for the service server to exercise preferences as to which service clients the service server will supply the requested item. In other words, the random wait time before responding to a request ensures that any one machine does not become an overloaded server of the item or update to the rest of the network. In addition, as a given item is propagated through the network to peers on the network, the load on any one node is likely further reduced. Thus, the system impact on a given service server as it supplies the requested item to service clients can be relatively minimal.

However, it is to be understood that a situation in which multiple service servers each transmitting an "I have" packet in response to a given request packet may occur. For example, a first service server may transmit an "I have" packet upon expiry of its delay response time period. The "I found" packet transmitted or to be transmitted by the requesting peer corresponding to the first "I have" packet may not arrive at the second service server prior to the expiry of its delay response time period, causing the second service server to transmit an "I have" upon expiry of its delay response time period. In such a situation where the requesting client receives multiple "I have" packets from multiple service servers, the requesting client may simply process the first "I have" response and ignore any subsequent "I have" packets it may receive.

Figure 4A:
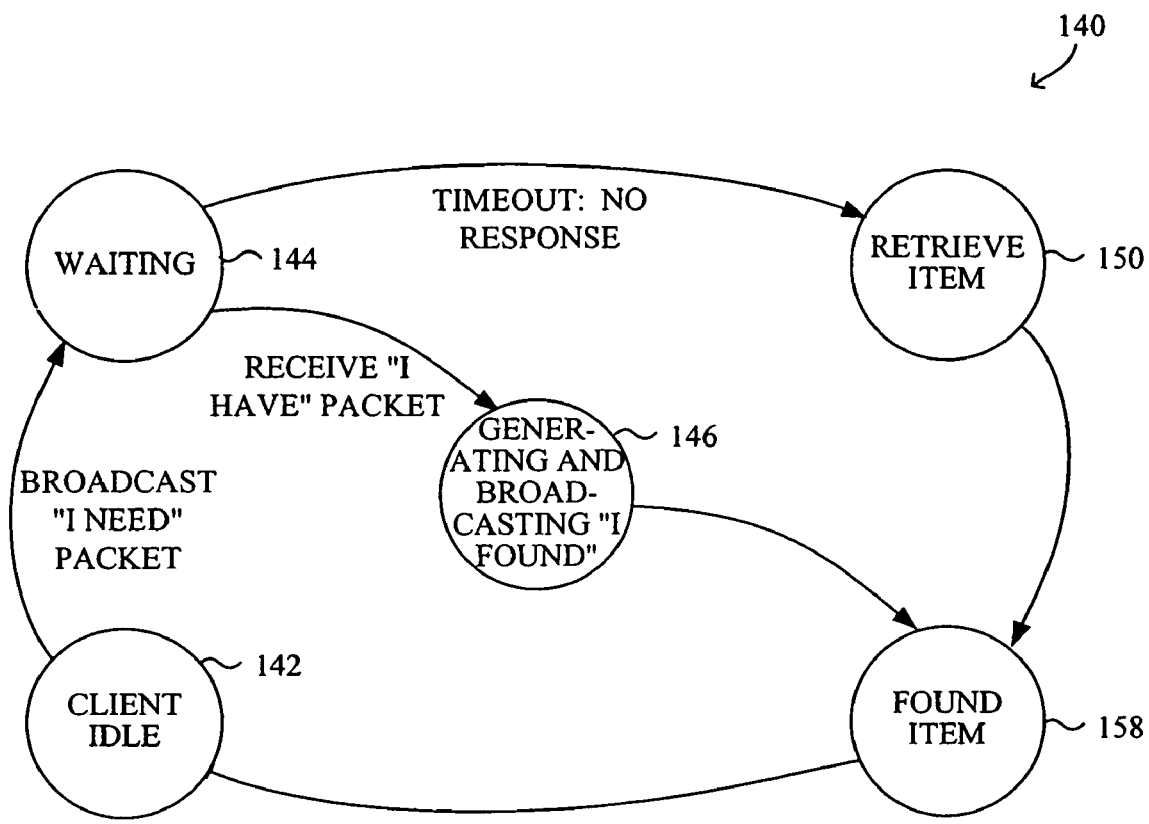
FIGS. 4A and 4B are alternative state diagrams illustrating states of a typical peering service client in requesting a resource over the peer-to-peer network.
Figure 4B:
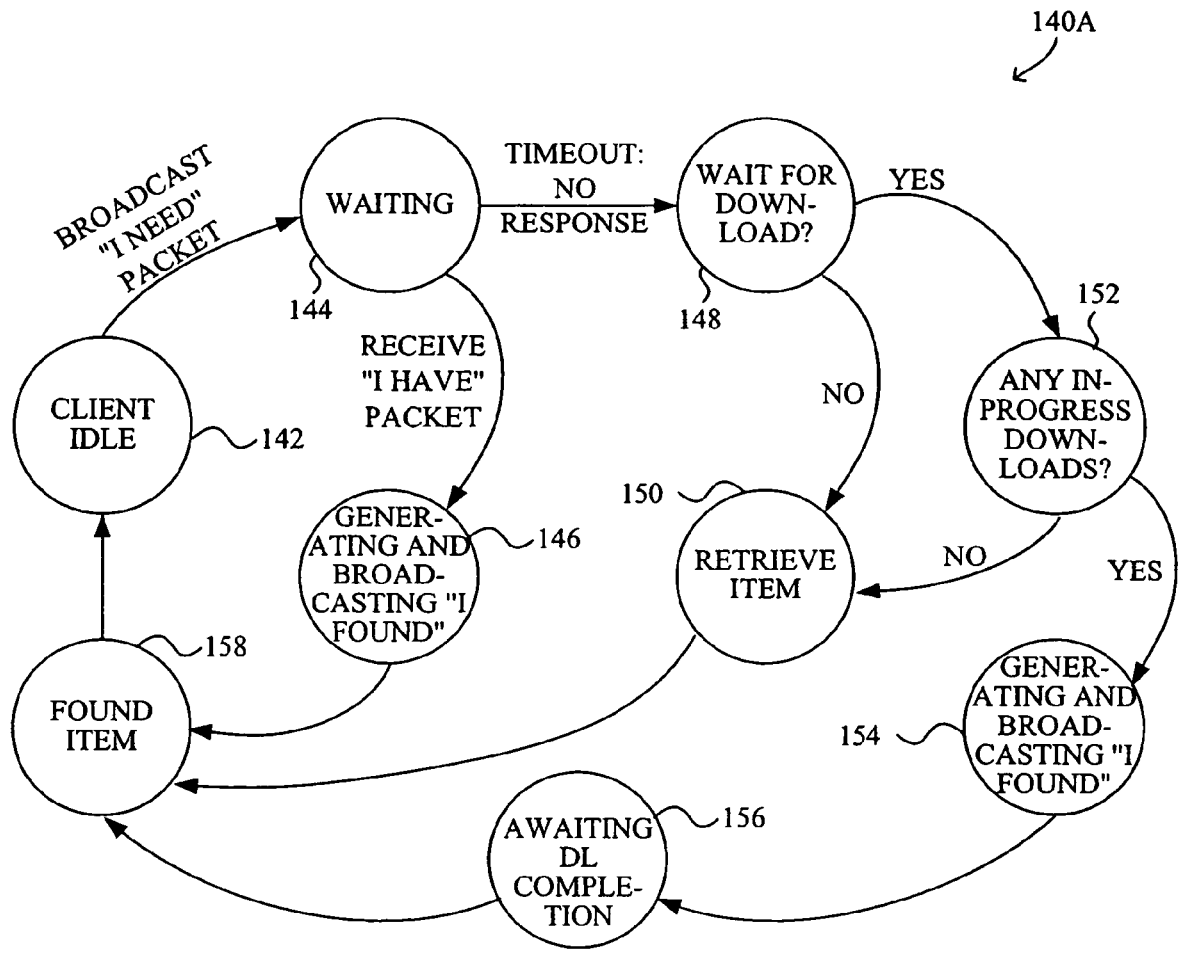

FIGS. 4A and 4B are alternative state diagrams illustrating states 140, 140A of a typical peering service client in making a given request for a resource over the peer-to-peer network. Referring to FIG. 4A, initially, the service client is in an idle state 142. When a service client needs a desired resource, such as an Internet resource, the service client generates and broadcasts an "I need" packet over the peer-to-peer network. For example, the "I need" request may specify an URL (e.g., http://something.tld/someother/thing/here), a protocol (e.g., HTTP protocol), a desired operation (e.g., get operation), and that the requesting peer only wants cached objects.

After broadcasting the "I need" request, the service client transitions to a waiting for response state 144 in which the service client awaits a maximum delay response time period plus a transmission time period for a response from any of the service servers. In the example above where the randomly generated delay response time period ranges between 0 and 2000 milliseconds, the client response waiting time period would be, for example, 2200 milliseconds to allow for a 200 millisecond transmission time period.

If an "I have" response is received from a service server during the client response waiting time, then the service client transitions to state 146 and generates and broadcasts an "I found" message over the network to inform all other peers that the desired resource or item has been found. The service client then transitions to the requested item found state 158. The service-enabled application requesting the item then retrieves the requested item from the responding service server at the location within the network as specified in the received "I have" packet. Generally, the service-enabled application retrieves the requested item through the local HTTP server using, for example, port 6515. Once the service-enabled application successfully retrieves the requested item, the service client informs the service server running on the same machine that a local copy of the resource now exists. The service client then returns to the idle state 142.

Alternatively, if no response is received during the client response waiting time, the service client times out and transitions to state 150 to retrieve the requested item itself such as via the Internet. Once the retrieval is complete, the service client transitions to found item state 158 in which the service client informs the service server running on the same computer or at the same node that a local copy of the resource now exists. The service client then returns to client idle state 142. As is evident, regardless of whether the service client received an "I have" packet from a service server on the network, the client machine can itself become a service server for the requested resource after successful completion of its request.

FIG. 4B illustrates the 140A states of a typical service in a preferred alternative embodiment particularly suitable for applications that include downloading of files. States 140A includes the states as shown and described with reference to FIG. 4A plus additional states for dealing with currently in-progress downloads of the requested item by other peers. These additional states allow a peer node to complete downloading the requested resource and then distribute it immediately and automatically upon download completion to the requesting service client.

In particular, instead of directly transitioning to state 150 to retrieve the requested item itself after the service client times out the request, the service client transitions to "wait for download?" state 144 in which the service client determines whether it can or will wait for completion of any in-progress download of the requested item by another peer. If not, then the service client transitions to state 150 to retrieve the requested item itself and continues with state transitions similar to that described above with reference to FIG. 4A.

If the service client determines that it can or will wait for the completion of any in-progress download, the service client transitions to "any in-progress downloads?" state 152. If there are no such in-progress downloads of the requested item, then the service client transitions to state 150 to retrieve the requested item itself and continues with state transitions similar to that described above with reference to FIG. 4A.

Alternatively, if there is at least one in-progress download of the requested item, then the service client transitions to state 154 in which it generates and broadcasts an "I found" message. The service client then transitions to state 156 to await completion of the in-progress download of the requested item. Upon completion of the in-progress download of the requested item, the service client transitions to the requested item found state 158. The service client retrieves the requested item from the local location within the network. After successful completion of its request, the service client will inform the service server running on the same machine that a local copy of the resource now exists. The service client then returns to the idle state 142.

As is evident, in order for the service client to determine if there are any in-progress downloads in state 152, a service client that is downloading a file for a service-enabled application preferably broadcasts a "downloading" message and/or directly responds to the client server of a broadcast "I need" request with a "I am downloading" rather than an "I have" response message. In one preferred embodiment, the service client may set a downloading flag for the corresponding file to true.

In addition, the service-enabled application preferably transmits periodic progress packets to any node that is waiting for the resource being downloaded such that those nodes may interactively display download progress information to end users at state 156. Alternatively, the service-enabled application may broadcast such periodic download progress packets over the network. Thus, a node in the retrieve item state 150 preferably periodically transmits a "downloading" message that includes progress information.

Service Functionality and Service Packet Format

One functionality provided by the peering service is that of a central clearing house for formatting, sending, receiving and decoding service packets, such as for "I need," "I found," and "I have" packets. In other words, the peering service manages the peer-to-peer communication process for obtaining requested items. The specific functionality invoked by a given service packet itself is generally dependent on the specific service-enabled application.

The communication protocol used in broadcasts (e.g., "I need" and "I found" packets) and responses (e.g., "I have" packets) is typically TCP/IP. Each packet is typically approximately 200 bytes in size and contains the node ID of the sender as well as any other suitable information. Transfer of the requested item from the service server to the service client is typically via HTTP.

The service packet format is preferably based upon the well-accepted and widely utilized XML format. For example, an XML service packet format may include a service identification and various key-value pairs, including those inserted by the service as well as those defined by the corresponding service-enabled application.

Various key-value pairs may be inserted by the peering service into each service packet. Examples of suitable key-value pairs include identification, type, and version key-value pairs. Specifically, an identification key-value pair identifies each request and responses corresponding to the request. In general, the identification value is unique on the originating node but need not be unique on the network as a whole. The range of values for the identification value may depend upon the number of bits assigned thereto. For example, 32 bits or four octets may be assigned to the identification value and thus the identification value would range from 0 to $2^{31}$. With respect to the type key-value pair, the type value is typically either request, end-request, response, and/or any application-defined value. Any other suitable application-defined key-value pairs may also be includes in the service packet.

An exemplary service packet may be:
<service type="request" version="1.0" ID="1111" method="get" href="http:/domain.com/whatever" acceptprotocol="http"/>

Figure 5:
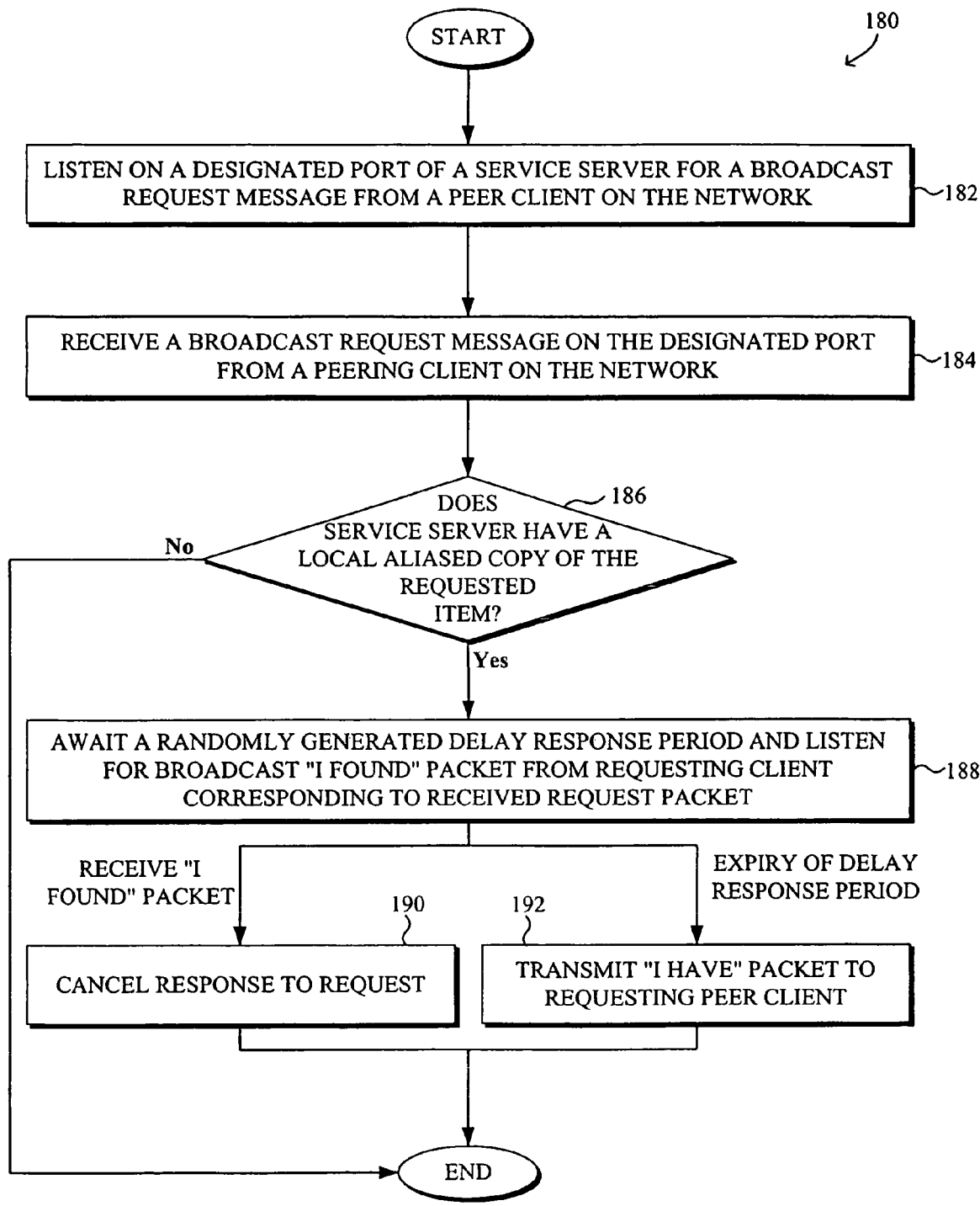
FIG. 5 is a flowchart illustrating a typical process of a peering service server in processing a request from a peering client in the peer-to-peer network.

FIG. 5 is a flowchart illustrating a typical process 180 of a peering service server in processing a request from a peering client in the peer-to-peer network. At step 182, the service server is listening on a designated port for a broadcast request message from a peer client on the network. At step 184, the service server receives a broadcast request message on the designated port such as an "I need" packet from a peering client on the network. At step 186, the service server determines if it has a local aliased copy of the requested item. In particular, the service server refers to its list of local aliased copies to determine if the service server has a local version of the requested resource or item, such as an URL/URI.

If the service server determines that it does not have a local copy of the requested resource, then the process 180 is complete. Alternatively, if the service server determines that it has a local copy, the service server preferably waits a randomly generated delay response time period while listening for a broadcast "I found" packet from the requesting client corresponding to the received request packet at step 188. As discussed above, the service server may generate a random number between 0 and 2000 as the length of time in milliseconds it waits before responding. The broadcast "I found" packet from the requesting client indicates that the requesting client has found the requested resource.

It is noted that throughout the process 180, the service server is preferably continuously listening for any additional broadcast request messages and performs process 180 for each received broadcast request message as they are received.

If the service server receives an "I found" packet from the requesting client before expiry of the delay response time period, the service server cancels the response to the request at step 190 and the process 180 is complete. Alternatively, if no "I found" packet is received prior to the expiration of the delay response time period, the service server transmits an "I have" packet directly to the requesting peer client at step 192 and the server process 180 is complete. The "I have" packet preferably contains a local alias for the requested object on the service server.

Figure 6:
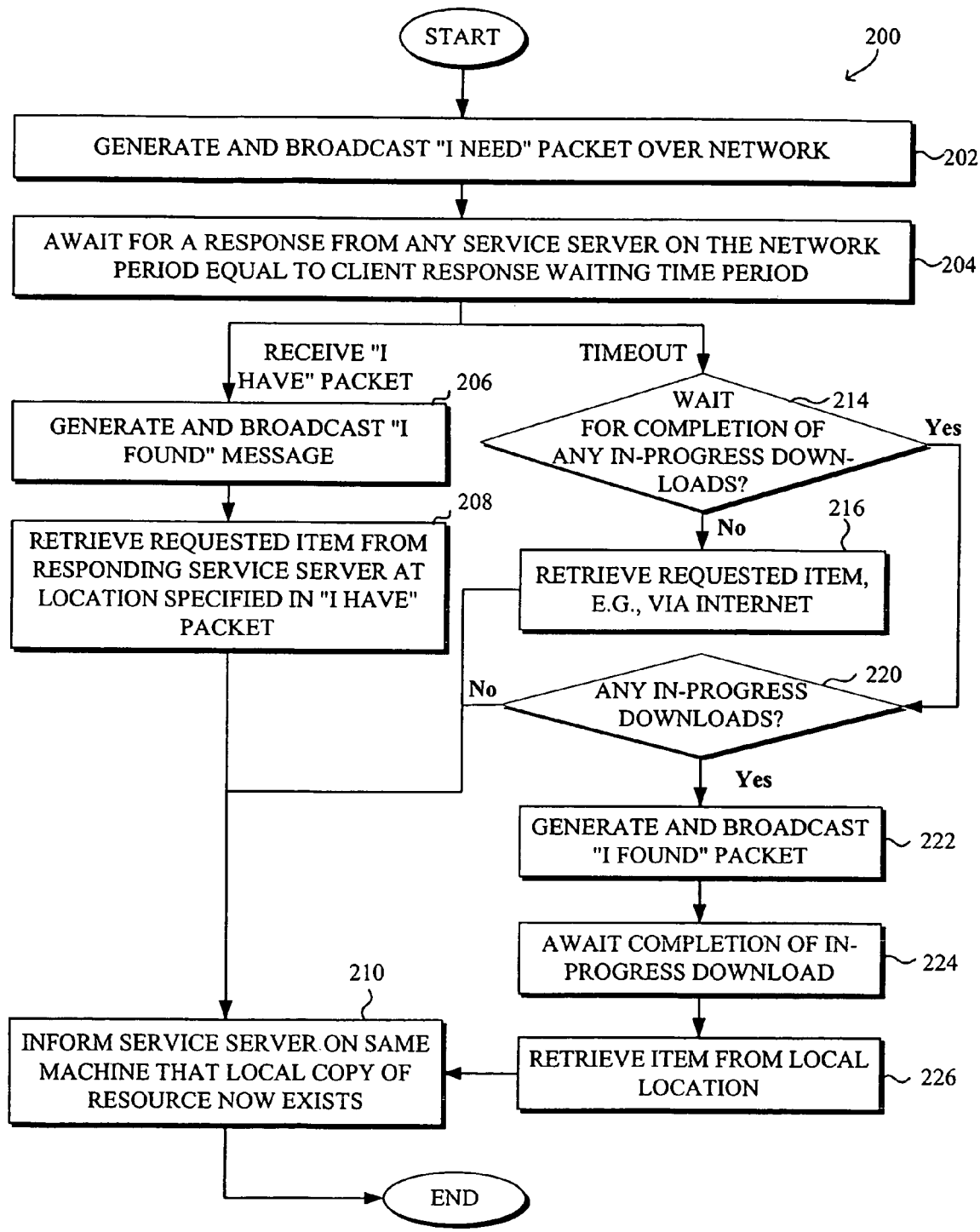
FIG. 6 is a flowchart illustrating a typical process of a peering service client in requesting a resource over the peer-to-peer network.

FIG. 6 is a flowchart illustrating a typical process 200 of a peering service client in requesting a resource over the peer-to-peer network. At step 202, the service client generates and broadcasts an "I need" packet over the peer-to-peer network on a designated port. At step 204, the service awaits for a response from any of the service servers on the network for a period equal to a client response waiting time period, typically a maximum delay response time period plus a transmission time period.

If an "I have" response is received from a service server during the client response waiting time, then the service client generates and broadcasts an "I found" message over the network at step 206. The service-enabled application requesting the item then retrieves the requested item from the responding service server at the location within the network as specified in the received "I have" packet at step 208. Once the service-enabled application successfully retrieves the requested item, the service client informs the service server running on the same machine that a local copy of the resource now exists at step 210. The process 200 is then complete.

Alternatively, if no response is received during the client response waiting time, i.e., the service client times out, the service client determines if the service-enabled application can or will wait for completion of any in-progress download of the requested item by another peer at step 214. If not, the service client retrieves the requested item itself such as via the Internet at step 216 and then proceeds to step 210 to complete the process 200.

If the service client determines that it can or will wait for the completion of any in-progress download, the service client determines whether there are any in-progress downloads at step 220. If there are no such in-progress downloads of the requested item, the service client then proceeds to step 210 to complete the process 200.

If there is at least one in-progress download of the requested item, then the service client generates and broadcasts an "I found" message at step 222. The service client then awaits completion of the in-progress download of the requested item at step 224. For example, the service client may receive an "I have" or a "Download complete" message from the downloading peer.

Figure 7:
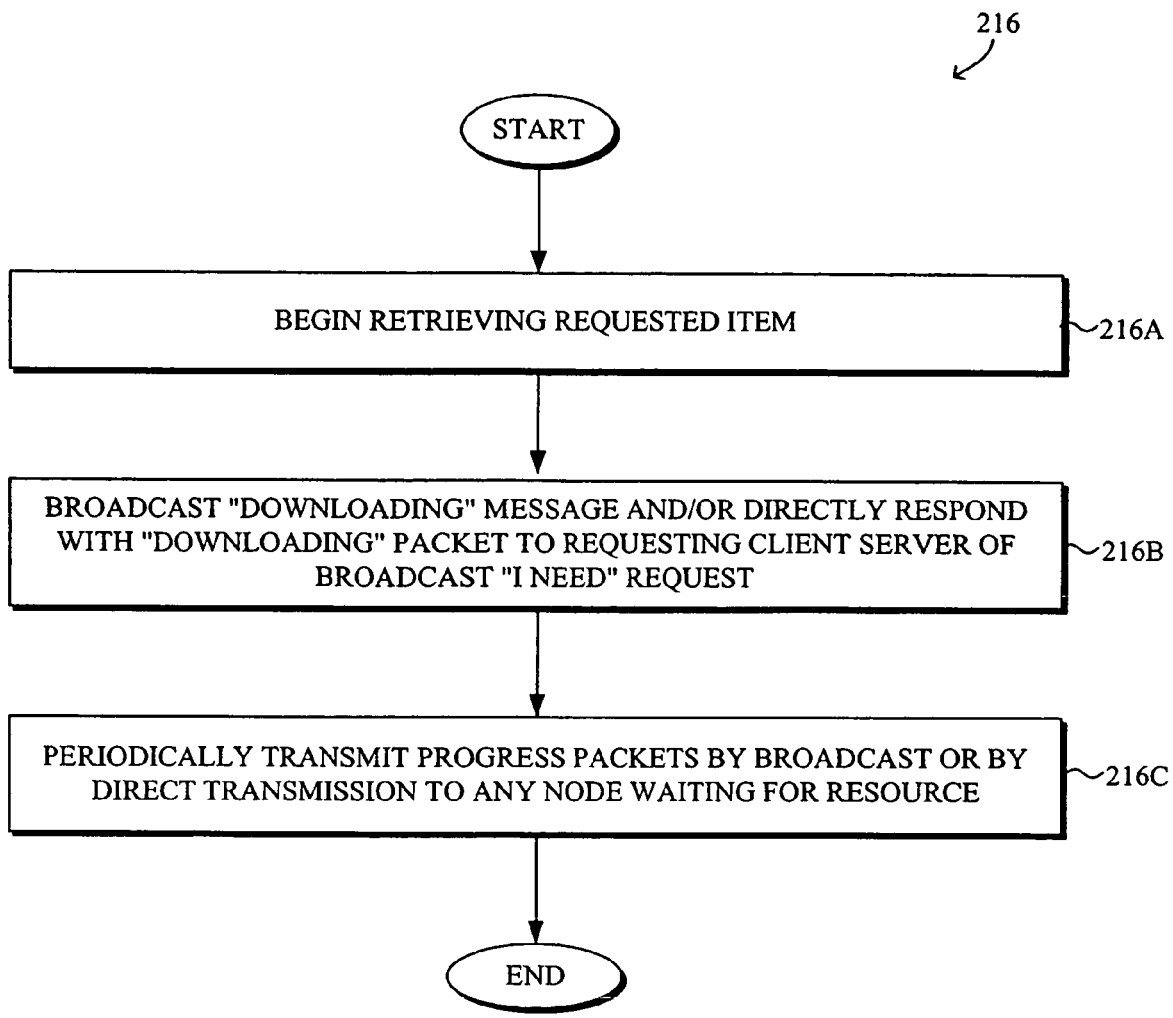
FIG. 7 is a flowchart illustrating a preferred embodiment of the retrieve step of FIG. 6 in more detail.

Upon completion of the in-progress download of the requested item, the service client retrieves the requested item from the local location within the network at step 226. After successful completion of its request, the service client then proceeds to step 210 to complete the process 200. It is noted that steps 214 and 220-226 can be optional and preferably implemented for applications that include downloading of files As is evident, in order for the service client to determine if there are any in-progress downloads at step 220, a service client that is downloading a file for a service-enabled application from outside of the network, e.g., from the Internet, notifies its peers on the network that a downloading process is in progress. For example, FIG. 7 is a flowchart illustrating a preferred embodiment of the retrieve step 216 in more detail.

As shown, the service client begins retrieving the requested item at step 216A. At step 216B, the service client may broadcast a "downloading" message and/or directly respond with a "I am downloading" response message to any client server that transmitted a broadcast "I need" request. In addition, the service client preferably also periodically transmits progress packets at step 216C either by broadcast or by direct transmission to any node that is waiting for the resource such that those nodes may interactively display download progress information to end users at those nodes. Alternatively, steps 216B and 216C may be combined into a single periodic packet transmission in which each packet is a "downloading" message that includes progress information.

Service-Enabled Product Updating Application

One exemplary implementation of the peering service described herein is a product updating service implementation and a service-enabled application having a shared agent. The agent is shared by an anti-virus application and a firewall application. The peering service is encapsulated in a single DLL that contains components for performing an update service, namely, a peering server having an HTTP server, a peering client, and a product updating service.

The product updating service determines what updates, if any, to request. If the product updating service determines that an update is necessary, the service client broadcasts an "I need" packet to request a specific URL for the necessary product updates. In other words, the peering service provides a mechanism for keeping service-enabled application, its engine, and its virus signature files up-to-date.

In particular, when a first computer or node boots, its product updater broadcasts an "I need" packet requesting for myupdate.cab file at a specified URL. The myupdate.cab file, e.g., approximately 7-8 k in size, contains a script with instructions on how to check the current version of the product, engine, and virus signature files against the latest available version so that the product updater can determine if an update is necessary. This file may not be cacheable, so the service servers may not be able to offer it and can instead be obtained directly via the Internet.

If the product updating service determines, based on the myupdate.cab file, that an update is necessary, the product updating service, via the peering service, broadcasts an "I need" packet over the network. An update may include engine, DAT, and/or product updates. For any update files that are downloaded, whether directly from the Internet and/or from one or more of the peers on the network, the product updating service preferably checks to ensure that the updates have been digitally signed. Once the updates are authenticated, they are installed at the requesting node.

The product update service checks for updates at any suitable pre-defined intervals and/or upon occurrence of various events. For example, the product update service may check for updates upon boot or 5 minutes after boot, 6 hours after each unsuccessful check, and/or upon a scheduled basis such as once a day, once every 12 hours after each successful check.

An update can include virus signature files (DATs), engine, and/or product update. DATs are typically updated weekly, such on a particular day of the week and are approximately 900-950 k in size on average. The engine is usually updated every 2 to 3 months and is approximately 550-600 k in size on average. The product is updated as hotfixes become available, typically every 6-8 weeks, or as new versions become available, typically every 4-6 months, and is approximately 700-750 k in size on average.

In the current example, a complete update, including engine, virus signature files and product, comprises of six *.cab files, totaling approximately 2.25 M. The six *.cab files for an update and their respective average sizes are listed below:

| | |
|---|---|
| Myavdat.YYMMDDHHMM.cab | average 910k |
| Myxtrdat.YYMMDDHHMM.cab | average 16k |
| Mycioagt.YYMMDDHHMM.cab | average 370k |
| Vsasap.YYMMDDHHMM.cab | average 360k |
| Vseng9x.YYMMDDHHMM.cab | average 240k |
| Vsengine.YYMMDDHHMM.cab | average 340k |

As any number of these *.cab files may need to be updated, each file is preferably requested via the peering service in a separate transaction. Thus, some or all of the needed *.cab file may be pulled from different nodes and/or the Internet.

Selection of Designated Service Provider

Under certain circumstances and/or for certain applications or tasks, it may be desirable to have a designated single point of responsibility such as by determining which computer or node on the network is most suitable to perform the desired service or task as a service provider. That computer thus preferably becomes the designated service provider to which all other peers on the peer-to-peer network will go to first for the specified service.

Such a selection of a designated service provider may be useful, for example, where some nodes are restricted from accessing the Internet (as shown in FIG. 1). However, many applications and/or their updates such as anti-virus and firewall applications are delivered and administered via the Internet such as anti-virus signature files. Thus, it may be preferably to designate a service provider at a node with Internet access in a peer-to-peer network to frequently check for and download files such as updates via the Internet to ensure that all nodes can obtain the most up-to-date versions of the distributable files or resources. Because peers on the network share a LAN path, the non-connected nodes thus have indirect access to the desired resources. In other words, an Internet-connect machine may serve as the designated service provider to act on behalf of nodes that are not connected to the Internet.

Once a service provider becomes a designated service provider, it would then check for and download as necessary. In the anti-virus and firewall applications example, the designated service provider only need to pull a relatively small catalog file on a frequent basis and update files on a much less frequent basis.

Figure 8:
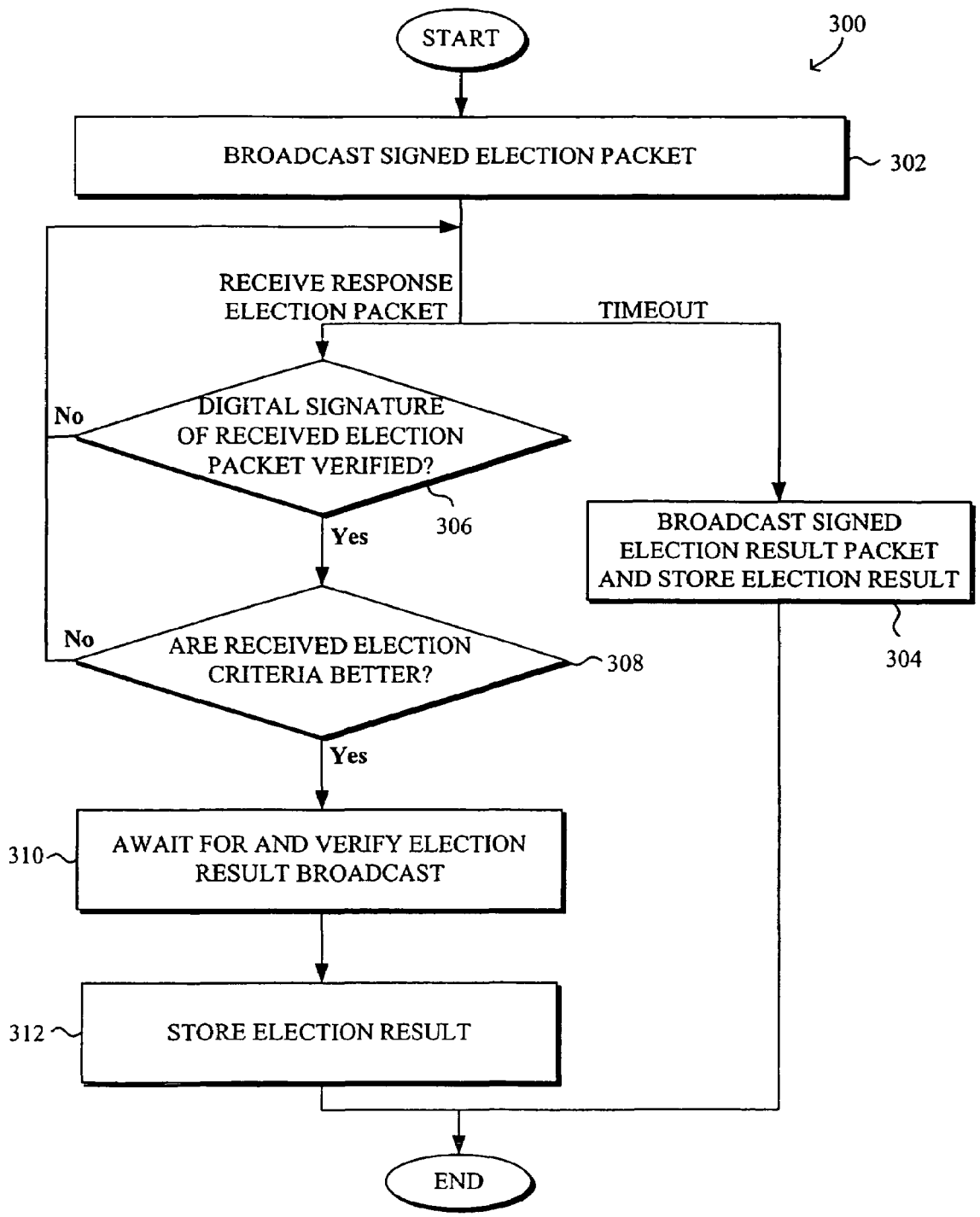
FIG. 8 is a flowchart illustrating an exemplary process implemented by a node or application at a node for automatically selecting a service provider from among the peers in the peer-to-peer network when the node initiates an election by broadcasting an election packet.
Figure 9:
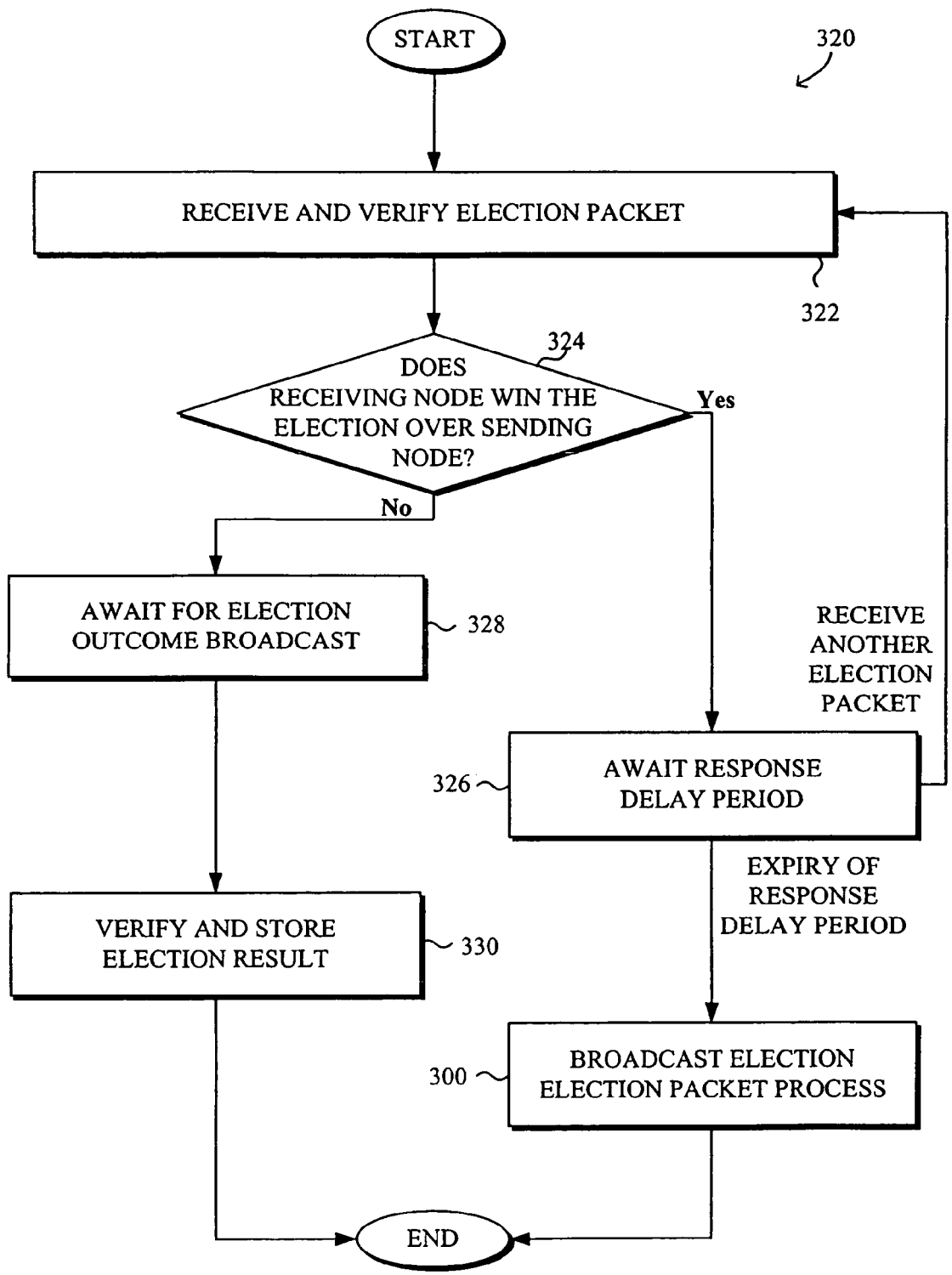
FIG. 9 is a flowchart illustrating an exemplary process implemented by a node or application at a node for automatically selecting a service provider from among the peers in the peer-to-peer network when the node receives an election packet in an election initiated by another node.

FIGS. 8 and 9 are flowcharts illustrating exemplary processes 300, 320 for implementing a process for automatically and securely electing or selecting a designated service provider from among the peers in the peer-to-peer network. In particular, FIG. 8 is a flowchart illustrating an exemplary process 300 implemented by a given node or application at a node when the node initiates an election by broadcasting an election datagram or packet. In addition, FIG. 9 is a flowchart illustrating an exemplary process 320 implemented by a given node or application at a node when the node receives an election packet in an election initiated by another node.

The automatic service provider selection process may be implemented by any service-enabled application such that there is a designated service provider for the given application. Alternatively, the automatic service provider selection process may be implemented by the peer-to-peer network such that there is a designated service provider for the peer-to-peer network as a whole. The service provider election process selects a designated service provider and optionally a back up designated service provider. For purposes of clarity of discussion only, the process is described only in terms of selecting a designated service provider without a back up designated service provider.

The service provider election process may be performed at any suitable time such as periodically, when a node cannot locate a designated service provider, when a preferred designated service provider, and/or any other suitable predetermined times or under any other suitable predetermined times circumstances. The designated service provider selection process preferably utilizes signed certificates to authenticate the legitimacy of the each node and thus potential designated service provider.

Referring now to the exemplary process 300 as shown in FIG. 8, at step 302, a node may initiate an election or selection process by broadcasting a digitally signed election datagram or packet to the other nodes in the peer-to-peer network. The election packet preferably specifies values for election criteria and optionally election criteria and their corresponding election criteria levels. Any suitable number of election criteria levels may be included in the packet such that in case of a tie at a higher-level criteria level, a next lower-level criteria may be utilized until the tie is broken. Preferably, the lowest criteria level would break all potential ties. For example, the lowest criteria level may be the node's name, MAC (media access control) address, or any other suitable node identification. Examples of other suitable criteria may include Internet access, bandwidth, operating system, and processor speed.

Next, if an election time-out occurs before the sending node receives an election packet in response from another node on the network, then the sending node wins the election and transmits an election outcome packet and optionally stores the election outcome at step 304. The time-out period is typically set to a maximum delay response period for any node to respond to the election packet plus maximum round trip transmission times, i.e., for both the initial broadcast and the response packets to reach their respective destinations. The receiving node process in responding to the initial election packet and the time-out period will be described in more detail below with reference to FIG. 9.

Alternatively, the sending node may receive an election packet from another node on the network prior to a time-out. In such a case, the sending node verifies a digital signature of the received election packet at step 306. In addition, the sending node preferably also verifies or determines if the election criteria of the node that transmitted the new packet wins over the current node at step 308. In particular, the current node compares its values for the criteria with those transmitted in the election packet. If either the digital signature or the election criteria is not verified at step 306 and 308, respectively, then the sending node returns to await either a time-out or to receive another election packet from another node on the network.

After the digital signature and the election criteria are verified, then at step 310, the sending node awaits for an election result broadcast transmitted from the winner of the election process. In addition, the sending node preferably verifies a digital signature of the received election result broadcast. Finally, the sending node stores the election result at step 312.

Referring now to the exemplary process 320 as shown in FIG. 9, a receiving node receives and verifies an digital signature of an election datagram or packet in an election initiated by another node at step 322. Next, at step 324, the receiving node determines if it would win over the sending node based on the election criteria. If so, then the receiving node preferably awaits a response delay period at step 326. Prior to the expiry of the response delay period, the receiving node continues to listen for and verify any election packets it may receive in the interim. If any additional election packets are received, the receiving node returns to step 322. Alternatively, if no additional election packets are received prior to the expiry of the response delay period, the receiving node responds with its own broadcast election packet and proceeds as in process 300 described above with reference to FIG. 8.

In particular, the delay response period is preferably implemented to reduce the overall number of election packets transmitted over the network. The response delay period is preferably randomly generated within a predetermined range. Each node may be assigned a current role value that generally corresponds to the likelihood that the given node would win the election. For example, a higher current role value may correspond to a higher likelihood that the given node would win the election and thus a lower predetermined range within which the response delay period for that node is randomly generated. Thus, nodes that are less likely to win the election would have a longer delay period, thereby reducing or minimizing the overall number of election packets transmitted over the peer-to-peer network.

On the other hand, if the receiving node determines that it would not win over the sending node based on the election criteria at step 324, the receiving node is silent and awaits for an election outcome broadcast at step 328. It is noted that in the meantime, any number of other receiving nodes may broadcast their own election packets in response to the initial election datagram. Lastly, the receiving node verifies for a digital signature and stores the received election result broadcast at step 330.

As illustrated in the description above, the peering service facilitates in reducing or minimizing the number of service clients that have to obtain files or other resources such as product update files via the Internet by using secure, peer-to-peer communication to distribute the files among client machines on a network, such as a LAN, via an intranet. The peering service enables secure, automatic distribution of the update files between service clients, independent of a network administrator or end-user, to keep the anti-virus and firewall application/service up-to-date with minimal impact to network bandwidth.

Often, many computers on a network do not have the most up-to-date anti-virus and/or firewall files. Using the secure peering service allows for automatic and secure updating of such files and also reduces or eliminates the need for a network administrator to script anti-virus file updates. Furthermore, by efficiently spreading load and utilizing resources across a local network over a high-speed LAN, a bandwidth crunch resulting from the computers pulling update files from the Internet is largely reduced. Thus, the peering service allows for ease of distribution of product upgrades and updates with a minimal number of computers requiring to connect to the Internet to obtain the necessary files resulting in a reduced usage of Internet bandwidth.

The peering service also allows a given client to pull the data files from any node on the network, rather than having to connect to a centralized server that might require several additional network hops, resulting in an optimal use of network bandwidth to distribute updates.

Figure 10:
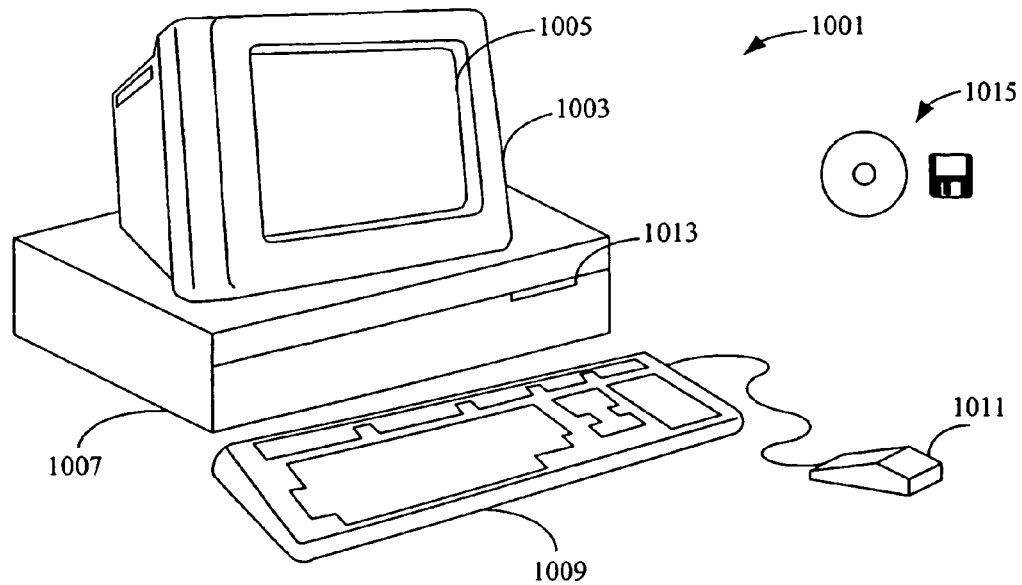
FIG. 10 illustrates an example of a computer system that can be utilized with the various embodiments of method and processing described herein.
Figure 11:
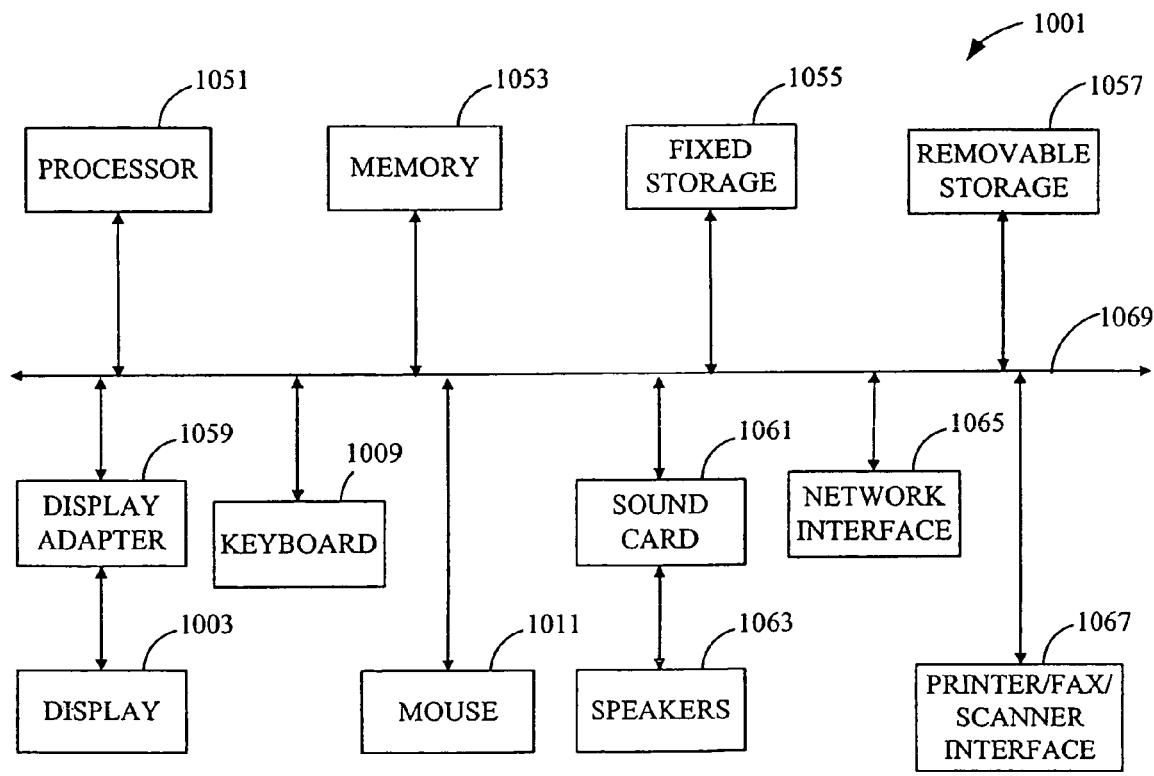
FIG. 11 illustrates a system block diagram of the computer system of FIG. 10.

FIGS. 10 and 11 illustrate a schematic and a block diagram, respectively, of an example of a general purpose computer system 1000 suitable for executing software programs that implement the methods and processes described herein. The architecture and configuration of the computer system 1000 shown and described herein are merely illustrative and other computer system architectures and configurations may also be utilized.

The illustrative computer system 1000 includes a display 1003, a screen 1005, a cabinet 1007, a keyboard 1009, and a mouse 1011. The mouse 1011 can have one or more buttons for interacting with a GUI (graphical user interface) that may be displayed on the screen 1005. The cabinet 1007 typically house one or more drives to read a computer readable storage medium 1015, system memory 1053, and a hard drive 1055, any combination of which can be utilized to store and/or retrieve software programs incorporating computer codes that implement the methods and processes described herein and/or data for use with the software programs, for example. Examples of computer or program code include machine code, as produced, for example, by a compiler, or files containing higher level code that may be executed using an interpreter.

Computer readable media may store program code for performing various computer-implemented operations and may be encompassed as computer storage products. Although a CD-ROM and a floppy disk 1015 are shown as exemplary computer readable storage media readable by a corresponding CD-ROM or floppy disk drive 1013, any other combination of computer readable storage media can be utilized. Computer readable medium typically refers to any data storage device that can store data readable by a computer system. Examples of computer readable storage media include tape, flash memory, system memory, and hard drive may alternatively or additionally be utilized. Computer readable storage media may be categorized as magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. Further, computer readable storage medium may also encompass data signals embodied in a carrier wave, such as the data signals embodied in a carrier wave carried in a network. Such a network may be an intranet within a corporate or other environment, the Internet, or any network of a plurality of coupled computers such that the computer readable code may be stored and executed in a distributed fashion.

Computer system 1000 comprises various subsystems. The subsystems of the computer system 1000 may generally include a microprocessor 1051, system memory 1053, fixed storage 1055 (such as a hard drive), removable storage 1057 (such as a CD-ROM drive), display adapter 1059, sound card 1061, transducers 1063 (such as speakers and microphones), network interface 1065, and/or scanner interface 1067.

The microprocessor subsystem 1051 is also referred to as a CPU (central processing unit). The CPU 1051 can be implemented by a single-chip processor or by multiple processors. The CPU 1051 is a general purpose digital processor which controls the operation of the computer system 1000. Using instructions retrieved from memory, the CPU 1051 controls the reception and manipulation of input data as well as the output and display of data on output devices.

The network interface 1065 allows CPU 1051 to be coupled to another computer, computer network, or telecommunications network using a network connection. The CPU 1051 may receive and/or send information via the network interface 1065. Such information may include data objects, program instructions, output information destined to another network. An interface card or similar device and appropriate software implemented by CPU 1051 can be used to connect the computer system 1000 to an external network and transfer data according to standard protocols. In other words, methods and processes described herein may be executed solely upon CPU 1051 and/or may be performed across a network such as the Internet, intranet networks, or LANs (local area networks), in conjunction with a remote CPU that shares a portion of the processing. Additional mass storage devices (not shown) may also be connected to CPU 1051 via the network interface 1065.

The subsystems described herein are merely illustrative of the subsystems of a typical computer system and any other suitable combination of subsystems may be implemented and utilized. For example, another computer system may also include a cache memory and/or additional processors 1051, such as in a multi-processor computer system.

The computer system 1000 also includes a system bus 1069. However, the specific buses shown are merely illustrative of any interconnection scheme serving to link the various subsystems. For example, a local bus can be utilized to connect the central processor to the system memory and display adapter.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. A method for secure automatic selection of a designated service provider in a peer-to-peer network, comprising:

receiving and verifying a digitally signed election initiating packet by a receiving node from a sending node in the network, the election packet containing a value for at least one criteria;

determining one of the receiving node and the sending node as current winner by comparing the value for the at least one criteria in the election initiating packet and a value for the at least one criteria of the receiving node;

awaiting for, verifying, and storing election result in an election result broadcast if the sending node is the current winner;

awaiting one of expiry of response delay period and receipt of an additional election packet if the receiving node is the current winner; and broadcasting a digitally signed election result packet indicating the receiving node is a designated service provider if the expiry of the response delay period occurs prior to the receipt of any additional election packet.

2. A method for secure automatic selection of a designated service provider in a peer-to-peer network of claim 1, wherein the verifying of the election result broadcast includes verifying a digital signature of the election result broadcast.

3. A method for secure automatic selection of a designated service provider in a peer-to-peer network of claim 1, wherein the at least one criteria includes at least one of node name, MAC (media access control) address, Internet access, bandwidth, operating system, and processor speed.

4. A method for secure automatic selection of a designated service provider in a peer-to-peer network of claim 1, wherein the response delay period is randomly generated within a predetermined range.

5. A method for secure automatic selection of a designated service provider in a peer-to-peer network of claim 1, wherein each of the election initiating packet and the election result packet is digitally signed by a 1024-bit VeriSign digital certificate.

6. A system including a tangible computer readable medium for secure automatic selection of a designated service provider in a peer-to-peer network, comprising:
   means for receiving and verifying a digitally signed election initiating packet by a receiving node from a sending node in the network, the election packet containing a value for at least one criteria;
   means for determining one of the receiving node and the sending node as current winner by comparing the value for the at least one criteria in the election initiating packet and a value for the at least one criteria of the receiving node;
   means for awaiting for, verifying, and storing election result in an election result broadcast if the sending node is the current winner;
   means for awaiting one of expiry of response delay period and receipt of an additional election packet if the receiving node is the current winner; and
   means for broadcasting a digitally signed election result packet indicating the receiving node is a designated service provider if the expiry of the response delay period occurs prior to the receipt of any additional election packet.

7. A system for secure automatic selection of a designated service provider in a peer-to-peer network of claim 6, wherein the verifying of the election result broadcast includes verifying a digital signature of the election result broadcast.

8. A system for secure automatic selection of a designated service provider in a peer-to-peer network of claim 6, wherein the at least one criteria includes at least one of node name, MAC (media access control) address, Internet access, bandwidth, operating system, and processor speed.

9. A system for secure automatic selection of a designated service provider in a peer-to-peer network of claim 6, wherein the response delay period is randomly generated within a predetermined range.

10. A system for secure automatic selection of a designated service provider in a peer-to-peer network of claim 6, wherein each of the election initiating packet and the election result packet is digitally signed by a 1024-bit VeriSign digital certificate.

11. A computer program product embodied on a tangible computer readable medium for secure automatic selection of a designated service provider in a peer-to-peer network, comprising:
   computer code for receiving and verifying a digitally signed election initiating packet by a receiving node from a sending node in the network, the election packet containing a value for at least one criteria;
   computer code for determining one of the receiving node and the sending node as current winner by comparing the value for the at least one criteria in the election initiating packet and a value for the at least one criteria of the receiving node;
   computer code for awaiting for, verifying, and storing election result in an election result broadcast if the sending node is the current winner;
   computer code for awaiting one of expiry of response delay period and receipt of an additional election packet if the receiving node is the current winner; and
   computer code for broadcasting a digitally signed election result packet indicating the receiving node is a designated service provider if the expiry of the response delay period occurs prior to the receipt of any additional election packet.

12. A computer program product for secure automatic selection of a designated service provider in a peer-to-peer network of claim 11, wherein the verifying of the election result broadcast includes verifying a digital signature of the election result broadcast.

13. A computer program product for secure automatic selection of a designated service provider in a peer-to-peer network of claim 11, wherein the at least one criteria includes at least one of node name, MAC (media access control) address, Internet access, bandwidth, operating system, and processor speed.

14. A computer program product for secure automatic selection of a designated service provider in a peer-to-peer network of claim 11, wherein the response delay period is randomly generated within a predetermined range.

15. A computer program product for secure automatic selection of a designated service provider in a peer-to-peer network of claim 11, wherein each of the election initiating packet and the election result packet is digitally signed by a 1024-bit VeriSign digital certificate.

* * * * *